(12) United States Patent
Amo

(10) Patent No.: US 6,200,402 B1
(45) Date of Patent: Mar. 13, 2001

(54) METHOD OF AND APPARATUS FOR LAMINATING DISC-SHAPED SUBSTRATES

(75) Inventor: Mikuni Amo, Tokushima-ken (JP)

(73) Assignee: Kitano Engineering Co., Ltd., Tokushima-ken (JP)

( * ) Notice: Subject to any disclaimer, the term of this patent is extended or adjusted under 35 U.S.C. 154(b) by 0 days.

(21) Appl. No.: 09/237,618

(22) Filed: Jan. 26, 1999

(30) Foreign Application Priority Data

Jan. 27, 1998 (JP) .................................................. 10-030509

(51) Int. Cl.⁷ .......................... B32B 31/04; B32B 35/00; G11B 7/26; B44C 1/165
(52) U.S. Cl. ......................... 156/235; 156/238; 156/540; 156/541
(58) Field of Search .................................... 156/230, 235, 156/238, 240, 247, 249, 289, 541, 542, 556, 580, 583.1, 555, 540

(56) References Cited

U.S. PATENT DOCUMENTS

| 2,810,976 | 10/1957 | Scott . |
| 4,481,067 | 11/1984 | Off et al. . |
| 4,861,411 | 8/1989 | Tezuka . |
| 4,939,011 | 7/1990 | Takahashi et al. . |
| 4,990,208 | 2/1991 | Kano . |
| 5,146,438 | 9/1992 | Harper . |
| 5,254,201 | 10/1993 | Konda et al. . |
| 5,284,538 | 2/1994 | Suzuki et al. . |
| 5,318,653 | 6/1994 | Toide et al. . |
| 5,470,420 | 11/1995 | Yokajty . |
| 5,600,359 | 2/1997 | Kikuchi . |
| 5,656,125 | 8/1997 | Tanaka . |
| 5,810,962 | 9/1998 | Annenkov et al. . |
| 5,980,677 | * 11/1999 | Amo et al. ............................ 156/230 |
| 6,004,420 | * 12/1999 | Nakamura et al. ................... 156/249 |

FOREIGN PATENT DOCUMENTS

| 1-224942 | * 9/1989 | (JP) . |
| 2-208841 | * 8/1990 | (JP) . |
| 2-210630 | * 8/1990 | (JP) . |
| 3-189939 | * 8/1991 | (JP) . |
| 3-230338 | * 10/1991 | (JP) . |

* cited by examiner

Primary Examiner—Curtis Mayes
(74) Attorney, Agent, or Firm—Flynn, Thiel, Boutell & Tanis, P.C.

(57) ABSTRACT

A method of and an apparatus for laminating disc-shaped substrates capable of automatically bonding an adhesive agent to disc-shaped substrates effectively and continuously. The method includes providing an adhesive sheet body comprising a plurality of adhesive agents each covered with a release paper, peeling off the release paper from the adhesive sheet body, positioning the adhesive sheet body from which the release paper has been peeled over a lower disc-shaped substrate, pressing the adhesive sheet body to allow the adhesive agent adhered to the lower surface thereof to bond or transfer onto a surface of the lower disc-shaped substrate, peeling off the adhesive sheet body from the adhesive agent bond onto the surface of the lower disc-shaped substrate, placing an upper disc-shaped substrate on the lower disc-shaped substrate, and pressing the upper disc-shaped substrate against the lower disc-shaped substrate, to bond the substrates to one another. The apparatus includes a holding table which supports a disc-shaped substrate thereon, supporting members (i.e. tension rollers) between which an adhesive sheet body extends over the holding table, a centering shaft for positioning the adhesive sheet body, a laminating roller for pressing the adhesive sheet body against the lower disc-shaped substrate, and a peeling member for peeling off the adhesive sheet body bonded onto the lower disc-shaped substrate.

20 Claims, 16 Drawing Sheets

FIG. 19

| STEP1 | PREPARING AN ADHESIVE SHEETBODY COMPRISING A PLURALITY OF ADHESIVE AGENTS EACH COVERED WITH A RELEASE PAPER |

| STEP2 | PEELING OFF THE RELEASE PAPER FROM THE ADHESIVE SHEETBODY |

| STEP3 | POSITIONING EACH ADHESIVE AGENT OF THE ADHESIVE SHEETBODY OVER A LOWER DISC-SHAPED SUBSTRATE USING A POSITIONING MEMBER |

| STEP4 | PRESSING THE ADHESIVE SHEETBODY FROM WHICH THE RELEASE PAPER IS PEELED OFF AGAINST THE LOWER DISC-SHAPED SUBSTRATE TO ALLOW THE ADHESIVE AGENT ADHERED TO THE LOWER SURFACE OF THE ADHESIVE SHEETBODY TO BOND ONTO A SURFACE OF THE LOWER SUBSTRATE |

| STEP5 | PEELING OFF THE ADHESIVE SHEETBODY FROM THE ADHESIVE AGENT BONDED ONTO THE LOWER DISC-SHAPED SUBSTRATE USING A PEELING MEMBER |

| STEP6 | PLACING AN UPPER DISC-SHAPED SUBSTRATE ON THE LOWER DISC-SHAPED SUBSTRATE |

| STEP7 | PRESSING THE UPPER DISC-SHAPED SUBSTRATE AGAINST THE LOWER DISC-SHAPED SUBSTRATE TO INTEGRALLY LAMINATE THE DISC-SHAPED SUBSTRATES |

FIG. 22
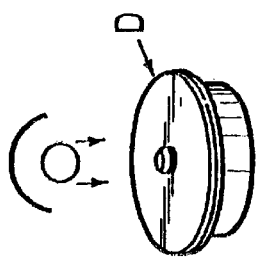
STEP (5)
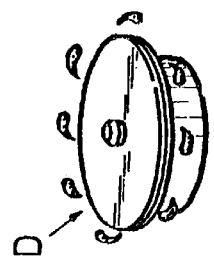
STEP (4)
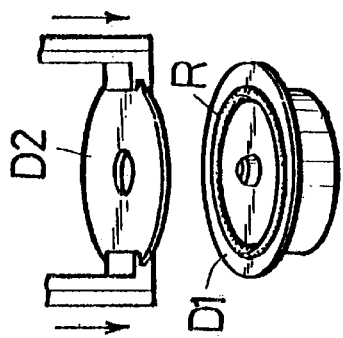
STEP (3)
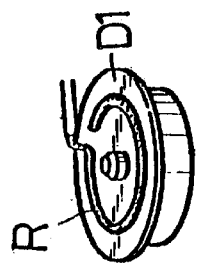
STEP (2)
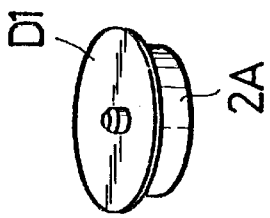
STEP (1)

METHOD OF AND APPARATUS FOR LAMINATING DISC-SHAPED SUBSTRATES

BACKGROUND OF THE INVENTION

1. Field of the Invention

The present invention relates to a method of and an apparatus for laminating disc-shaped substrates, particularly to a method of integrally laminating two disc-shaped substrates using an adhesive sheet and an apparatus for carrying out the method, namely, an apparatus for bonding the adhesive sheet body onto two disc-shaped substrates.

2. Prior Art

Computers, especially personal computers have recently become popular, and the types of storage media for use therewith have increased. These types include magnetic discs, optical discs (e.g., CD-ROM), optical magnetic discs (e.g., MO), etc. The demand for optical discs has increases recently.

A DVD is one type of optical disc, and a disc-shaped substrate that is a single plate constituting the DVD is standardized to have a thickness of 0.6 mm, an outer diameter of 120 mm, an inner diameter of its central hole of 15 mm. Since such a thin disc-shaped substrate formed of a single plate is low in mechanical strength and is easily deformable, and in view of storage capacity, two disc-shaped substrates each having the same thickness (0.6 mm) are bonded onto each other to form an integrated substrate in a practical use thereof.

Such a high density storage disc (i.e. a DVD) is generally used as a laminated structure as set forth above, but is not used as a single plate. In such a case, it is necessary that both the upper and lower disc-shaped substrates be bonded onto each other.

A series of steps have been taken to manufacture an integrated storage disc (e.g. an optical disc) by bonding two disc-shaped substrates (see FIG. 22), as in the following.

(1) a step of placing a lower disc-shaped substrate D1 on a holding table 2A;

(2) a step of coating an adhesive agent R made of UV cured resin to the lower disc-shaped substrate D1;

(3) a step of placing an upper disc-shaped substrate D2 on the lower disc-shaped substrate D1 to overlay the former on the latter;

(4) a step of rotating the holding table 2A to develop the adhesive agent R interposed between the disc-shaped substrates D1 and D2 on the entire surfaces thereof; and (5) a step of irradiating the developed adhesive agent made of UV cured resin with UV to cure the adhesive agent.

The storage disc is manufactured by the aforementioned steps, namely, the two disc-shaped substrates D1 and D2 are bonded onto each other to form a single integrated optical disc.

However in such a bonding method, since the adhesive agent is developed in a wider range by rotating the holding table, the adhesive agent is scattered outwardly due to centrifugal force. The periphery of the storage disc is made dirty or contaminated by the spray of the adhesive agent, or the adhesive agent is scattered and lost and hence the using efficiency of the adhesive agent is lowered.

Further, there is a problem that the thickness of the adhesive layer is not at all uniform. Still further, there is another problem that the number of manufacturing steps increases to increase the manufacturing cost because of the necessity of the step of irradiating adhesive agent with UV to cure the adhesive agent.

Accordingly, a method of bonding two disc-shaped substrates using an adhesive agent without requiring the developing step of the adhesive agent as set forth above has been studied. In the bonding method using an adhesive agent, the adhesive agent is bonded onto one of two disc-shaped substrates to be bonded, thereafter the other disc-shaped substrate is overlaid on the disc-shaped substrate onto which the adhesive agent is bonded.

An adhesive agent is generally used in a state where it is bonded onto a sheeting, i.e. an adhesive sheet body forming a base member, that is, a plurality of adhesive sheets or the adhesive agents are adhered to the adhesive sheet body. Accordingly, it is very ineffective to peel off the adhesive agent adhered to the adhesive sheet body one by one manually to bond or transfer it onto the lower disc-shaped substrate when two disc-shaped substrates are bonded onto each other. Further, fine air bubbles are liable to enter between the adhesive and the lower disc-shaped substrate when manually peeling off the adhesive agent. Still further, the bonding operation of an adhesive agent needs to be automated to incorporate the bonding operation of the adhesive agent to the disc-shaped substrates into the laminating lines of the disc-shaped substrates so as to produce a series of laminating lines which are sequentially controlled as a whole. That is, it is necessary to automatically bond the adhesive agent to the disc-shaped substrate to produce continuous laminating lines.

SUMMARY OF THE INVENTION

The present invention has been developed to solve the aforementioned problems. That is, it is an object of the invention to provide a method of laminating disc-shaped substrates capable of automatically bonding an adhesive agent to the disc-shaped substrate very effectively and continuously, and an apparatus for carrying out this method.

It is another object of the invention to provide a method of laminating disc-shaped substrates capable of preventing air from entering between the adhesive and one substrate when bonding the disc-shaped substrates by the adhesive agent, and an apparatus for carrying out this method.

The inventors of the present application endeavored themselves to study the aforementioned problems and have found that release paper can be peeled off from an adhesive agent bonded onto an adhesive sheet body, and the exposed adhesive agent can be bonded onto the lower disc-shaped substrate so as to sequentially bond the adhesive agent to the lower disc-shaped substrate, and thereafter has completed the invention.

A first aspect of the invention resides in a method of laminating disc-shaped substrates comprising preparing an adhesive sheet body S comprising a plurality of adhesive agents S2 each covered with a release paper S3, peeling off the release paper S3 from the adhesive sheet body S, positioning the adhesive sheet body S from which the release paper S3 is peeled off over a lower disc-shaped substrate D1, pressing the adhesive sheet body S to allow the adhesive agent S2 adhered to the lower surface of the adhesive sheet body S to bond or transfer onto a surface of the lower disc-shaped substrate D1, peeling off the adhesive sheet body S from the adhesive agent S2 bonded onto the surface of the lower disc-shaped substrate D1, placing an upper disc-shaped substrate D2 on the lower disc-shaped substrate D1, pressing the upper disc-shaped substrate D2 against the lower disc-shaped substrate D1, thereby bonding the lower disc-shaped substrate D1 and the upper disc-shaped substrate D2.

A second aspect of the invention resides in the method of laminating disc-shaped substrates comprising the steps of:
(1) preparing an adhesive sheet body S comprising a plurality of adhesive agents S2 each covered with a release paper S3;
(2) peeling off the release paper S3 from the adhesive sheet body S;
(3) positioning each adhesive agent S2 of the adhesive sheet body S over a lower disc-shaped substrate D1 using a positioning member;
(4) pressing the adhesive sheet body S from which the release paper S3 is peeled off against the lower disc-shaped substrate D1 to allow the adhesive agent S2 adhered to the lower surface of the adhesive sheet body S to bond onto a surface of the lower substrate D1 by moving a laminating member from one end of the lower disc-shaped substrate D1 to the other end thereof;
(5) peeling off the adhesive sheet body S from the adhesive agent S2 bonded onto the lower disc-shaped substrate D1 using a peeling member;
(6) placing an upper disc-shaped substrate D2 on the lower disc-shaped substrate D1; and
(7) pressing the upper disc-shaped substrate D2 against the lower disc-shaped substrate D1 to integrally laminate the disc-shaped substrates D1 and D2.

A third aspect of the invention resides in the method of further including a step of collecting the release paper S3 in the second aspect of the invention.

A fourth aspect of the invention resides in the method wherein the step of collecting the release paper S3 in the second aspect of the invention is performed using an adhesive tape having an adhesion relative to the release paper S3 which is greater than that of the adhesive agent S2 relative to the release paper S3.

A fifth aspect of the invention resides in the method wherein the step of (3) in the second aspect of the invention is performed in a state where a weak tension is applied to the adhesive sheet body S.

A sixth aspect of the invention resides in the method of laminating disc-shaped substrates of the second aspect of the invention, wherein the step of (3) is performed by inserting the tip end of a centering shaft 3 serving as the positioning member into a hole P of the adhesive sheet.

A seventh aspect of the invention resides in the method wherein the adhesive sheet body S used in the step of (3) in the second aspect of the invention is slightly inclined relative to the lower disc-shaped substrate D1.

An eighth aspect of the invention resides in the method wherein the laminating member used in the step of (4) in the second aspect of the invention is a rolling laminating roller.

A ninth aspect of the invention resides in the method wherein the peeling in the step of (5) in the second aspect of the invention is performed by the peeling member that traverses over the lower disc-shaped substrate D1.

A tenth aspect of the invention resides in the method wherein the peeling member in the ninth aspect of the invention peels off the adhesive sheet body S from the adhesive agent S2 while supporting the adhesive sheet body S in a state where the adhesive sheet body S and the lower disc-shaped substrate D1 do not contact each other to keep a slight gap therebetween.

An eleventh aspect of the invention resides in the method wherein the peeling member in the ninth aspect of the invention has two support rods and the adhesive sheet body S is extended between these two support rods.

A twelfth aspect of the invention resides in the method wherein the peeling member in the ninth aspect of the invention peels off the adhesive sheet body S at an acute angle between the adhesive sheet body S and the lower disc-shaped substrate D1.

A thirteenth aspect of the invention resides in a method of laminating disc-shaped substrates comprising the steps of:
(1) preparing an adhesive sheet body S comprising a plurality of adhesive agents S2 each covered with a release paper S3;
(2) peeling off the release paper S3 from the adhesive sheet body S;
(3) positioning each adhesive agent S2 of the adhesive sheet body S over a lower disc-shaped substrate D1 by inserting the tip end of the positioning member into the hole P of the adhesive sheet body S;
(4) pressing the adhesive sheet body S from which the release paper S3 is peeled off to allow the adhesive agent S2 adhered to the lower surface of the adhesive sheet body S to bond or transfer onto a surface of the lower disc-shaped substrate D1 by moving a rolling laminating roller from one end of the lower disc-shaped substrate D1 to the other end thereof;
(5) peeling off the adhesive sheet body S from the adhesive agent S2 bonded onto the surface of the lower disc-shaped substrate D1 in the manner that the peeling member traverses while supporting the adhesive sheet body S in a state where the adhesive sheet body S and the lower disc-shaped substrate D1 do not contact each other to keep a slight gap therebetween.
(6) placing an upper disc-shaped substrate D2 on the lower disc-shaped substrate D1; and
(7) pressing the upper disc-shaped substrate D2 against the lower disc-shaped substrate D1 to bond the lower disc-shaped substrate D1 and the upper disc-shaped substrate D2.

A fourteenth aspect of the invention resides in a laminating apparatus for laminating disc-shaped substrates comprising a holding table (2) to place a lower disc-shaped substrate D1 thereon, supporting members (tension rollers 5A, 5B) for extending an adhesive sheet body S therebetween at a given interval over the holding table (2), a centering shaft (3) for positioning the adhesive sheet body S, a laminating roller 1 for pressing the adhesive sheet body S against the lower disc-shaped substrate D1 to bond the adhesive sheet body S onto the lower disc-shaped substrate D1 while moving on the lower disc-shaped substrate D1 from one end thereof to the other thereof, and a peeling member 4 for peeling off the adhesive sheet body S bonded onto the lower disc-shaped substrate D1 from the lower disc-shaped substrate D1.

A fifteenth aspect of the invention resides in the laminating apparatus wherein the centering shaft 3 in the fourteenth aspect of the invention comprises a second small diameter portion 32 that is inserted into a boss hole 21 of the holding table 2, a first small diameter portion 31 that is inserted into the hole P of the adhesive sheet body S, and a large diameter portion 33 that contacts the back surface of the adhesive sheet body S.

A sixteenth aspect of the invention resides in the laminating apparatus wherein the peeling member 4 in the fourteenth aspect of the invention comprises a base 41 that traverses and rolls, a leading support rod 43 and an angle restriction support rod 42 respectively provided at positions remote from the center of the base 41 by given intervals.

A seventeenth aspect of the invention resides in the laminating apparatus wherein the angle restriction support rod 42 of the peeling member 4 in the sixteenth aspect of the invention has an acute angle portion 42A by which the adhesive sheet body S is peeled off from the lower disc-shaped substrate D1 at an acute guiding angle α.

With the employment of the methods of laminating disc-shaped substrates according to the first to the twelfth aspects of the invention, the adhesive agent can be continuously and automatically bonded onto the lower disc-shaped substrate thereby making it possible to effectively bond the disc-shaped substrates.

BRIEF DESCRIPTION OF THE DRAWINGS

FIGS. 10(A), 10(B) and 10(C) are views showing operations of the centering shaft and the laminating roller, wherein FIG. 10(A) is a view showing the operations at the positioning time of the centering shaft relative to the adhesive sheet body, FIG. 10(B) is a view showing the operations at the contact between the laminating roller and the adhesive sheet body, and FIG. 10(C) is a view showing the operation when the laminating roller moves on the adhesive sheet body.

FIGS. 11(A), 11(B) and 11(C) are views showing operations of the peeling member, wherein FIG. 11(A) is a view showing the state before the adhesive sheet body is extended, FIG. 11(B) is a view showing the state after the adhesive sheet body is extended, and FIG. 11(C) is a view showing the state where the adhesive sheet body is peeled off from the adhesive agent;

FIGS. 12(A) and 12(B) are views showing a state where the adhesive sheet body is extended between the angle restriction support rod and the leading support rod, wherein FIG. 12(A) is a simplified front view and FIG. 12 (B) is a simplified side view;

FIGS. 13(A) and 13(B) are views showing a state where the peeling member is rotated so as to form the adhesive sheet body in an inverse Z-shape wherein FIG. 13(A) is a simplified front view and FIG. 13 (B) is a simplified side view;

FIGS. 15(A) and 15(B) are a views of a lower disc-shaped substrate onto which the adhesive agent is bonded, wherein FIG. 15(A) is a side view and FIG. 15(B) is a plan view.

FIG. 19 is a block diagram showing steps in the method of laminating disc-shaped substrates according to the present invention;

FIGS. 20(A), 20(B) and 20(C) are views showing the adhesive sheet body, wherein

FIG. 20(A) is a front view,

FIG. 20(B) is a side view, and

FIG. 20(C) is a side view showing the state where the release paper is removed from the adhesive sheet body;

FIG. 22 is a schematic view showing a conventional method of laminating disc-shaped substrates using an adhesive agent.

PREFERRED EMBODIMENT OF THE INVENTION

A method of laminating disc-shaped substrates according to the present invention will be now described with reference to FIGS. 1 to 9 showing the steps for bonding an adhesive agent S2 to a lower disc-shaped substrate D1.

Before explaining the present invention with reference to FIGS. 1 to 9, an adhesive sheet body S, which is prepared for performing the present invention, is explained. The adhesive sheet body S comprises a carrier S1 formed of a long base or sheet, adhesive agent S2 which is bonded onto the carrier S1 and formed of synthetic resin tape such as thin polyethylene and a release paper S3 temporarily bonded onto the surface of the adhesive agent S2 (See FIG. 1).

Figure 20:
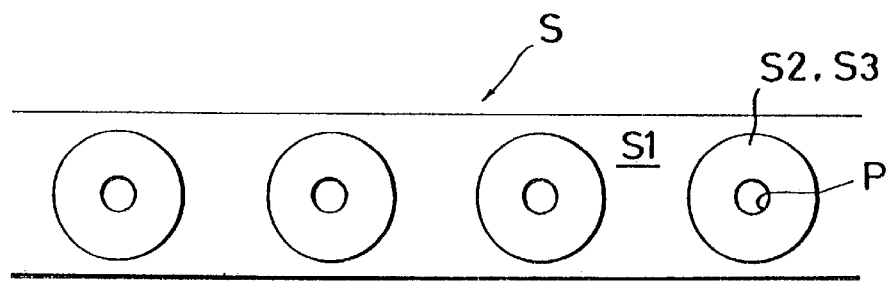
Figure 20:
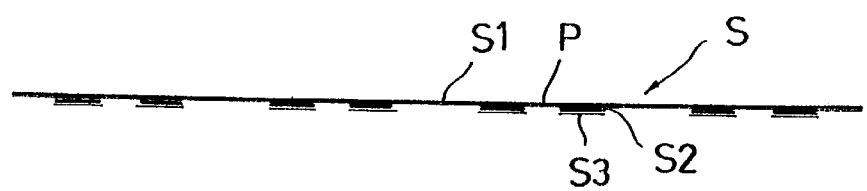
Figure 20:
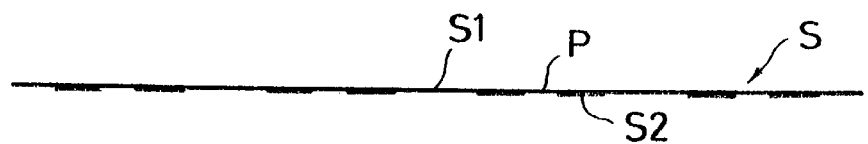

FIG. 20(A) is a front view of the adhesive sheet body S, FIG. 20(B) is a side view of the adhesive sheet body S and FIG. 20(C) is a side view showing a state where the release paper S3 is removed or peeled off from the adhesive sheet body S.

The adhesive agent S2 forms a fixed medium for integrally laminating the disc-shaped substrates D1 and D2 described later, and comprises a plurality of LP (long-playing record)-shaped sheets (or doughnut shape) (See FIG. 21(A)) each bonded onto the surface of the carrier S1 at regular intervals. There is employed a pressure sensitive adhesive agent as the adhesive agent S2 such as rubber-based adhesive agent, acrylic adhesive agent, silicon adhesive agent, and a vinyl adhesive agent. It is possible to select the optimum thickness of the adhesive agent S2 depending on the kind of optical disc to be designed.

Figure 21:
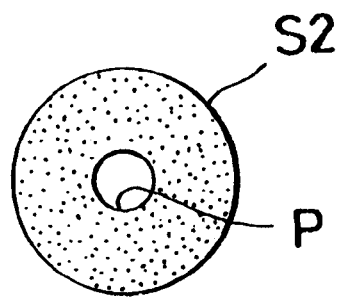
FIG. 21(A) is a view showing the shape of the adhesive agent.
FIG. 21(B) is a view showing the shape of the release paper.
Figure 21:
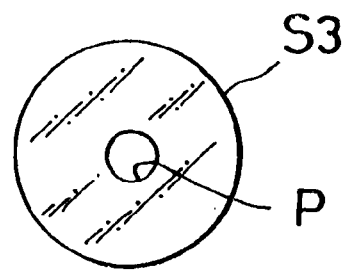

The release paper S3 is temporarily adhered to the adhesive agent S2 to cover the adhesive agent S2 and has the same shape as that of the adhesive agent S2 (See FIG. 21(B)).

The adhesive sheet body S has many holes P each penetrating the carrier S1, adhesive agent S2 and the release paper S3 at the same time when it is manufactured. Each hole P is utilized for positioning the adhesive agent S2 relative to the holding table 2 using a centering shaft serving as a positioning member, described later. The release paper S3 is peeled off from the adhesive sheet body S when the adhesive sheet body S is supplied between a pressing body 1 and the holding table 2.

Described next is a flow or series of steps of bonding the adhesive agent S2 onto the lower disc-shaped substrate D1.

Figure 1:
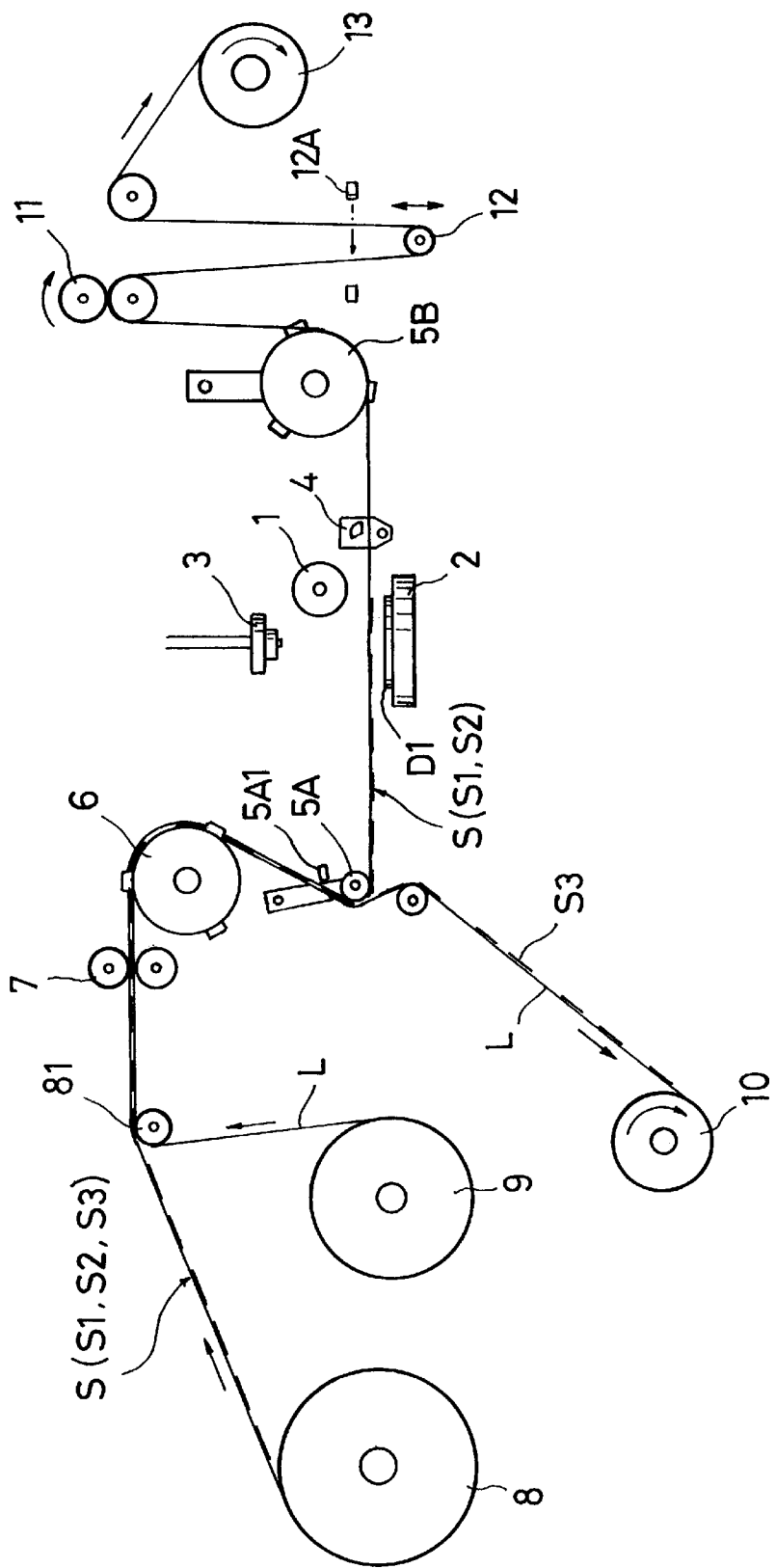
FIG. 1 is a view showing how to bond an adhesive agent when laminating disc-shaped substrates.
Figure 2:
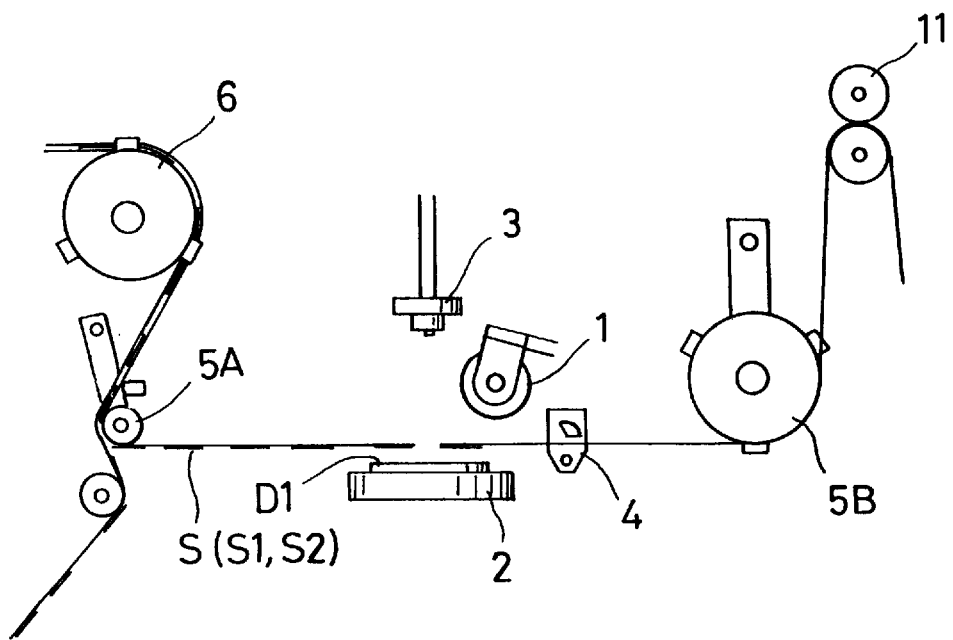
FIG. 2 is a view showing how to bond the adhesive agent in a relaxed state of the adhesive sheet body S.

FIG. 1 shows a method of bonding the adhesive agent S2 and an apparatus for laminating the adhesive sheet body S wherein the adhesive sheet body S is released and unwound from a first supply roller 8. Bonded matter such as dust is removed from the adhesive sheet body S by a cleaning roller 7 after the adhesive sheet body S unwound from the first supply roller 8. Thereafter, the adhesive sheet body S passes through a pitch feed roller 6, then it is supplied to a tension roller 5A provided upstream relative to the holding table 2 (hereinafter referred to as upstream tension roller 5A). The adhesive sheet body S that passed through the upstream tension roller 5A then passes through a space between the holding table 2 and a laminating roller 1 serving as a laminating member, and delivered to a tension roller 5B provided downstream relative to the holding table 2 (hereinafter referred to as downstream tension roller 5B).

The holding table 2 is installed on a rotary table T and it is moved right under the centering shaft 3 by the rotary motion of the rotary table T.

The lower disc-shaped substrate D1 has been already placed on the holding table 2. The adhesive sheet body S receives a pressing force between the holding table 2 and pressing body 1 so as to allow the adhesive agent S2 to be bonded onto the surface of the lower disc-shaped substrate D1 which is placed on the holding table 2 in a state where the adhesive sheet body S is extended between the upstream tension roller 5A and the downstream tension roller 5B. After the adhesive agent S2 is bonded onto the surface of the lower disc-shaped substrate D1, the adhesive sheet body S passes through the downstream tension roller 5B, then it is supplied to a feed roller 11.

The feed roller 11 is positively driven so as to move the adhesive sheet body S when necessary.

The adhesive sheet body S fed from the feed roller 11 is wound by a winding roller 13 through a hanging roller 12. Since the hanging roller 12 is hung from the adhesive sheet body S the roller 12 lowers when the adhesive sheet body S is fed from the feed roller 11. A detector 12A detects the lowering position of the hanging roller 12, and issues a detection signal. The winding roller 13 is rotated upon detection of the detection signal from the detector 12A so as to wind the adhesive sheet body S by a given amount. In the flow of steps as set forth above, the adhesive agent S2 is bonded onto the lower disc-shaped substrate D1.

Meanwhile, the adhesive sheet body S is supplied between the holding table 2 and laminating roller 1 in a state where the release paper S3 is removed from the adhesive agent S2 while the adhesive agent S2 is exposed on the lower surface of the adhesive sheet body S.

An adhesive tape L is used as means for removing or peeling off the release paper S3 from the adhesive sheet body S. Referring to the function of the adhesive tape L, as illustrated in FIG. 1, the adhesive sheet body S first unwound from the supply roller 8 has the adhesive agent S2 adhered to the lower surface thereof, and the release paper S3 is applied to the adhesive face of the adhesive agent S2.

The adhesive tape L that is supplied from a supply roller 9 has an adhesive face confronting the adhesive sheet body S (namely, it is provided on the front side thereof), and the adhesive face of the adhesive tape L opposes the release paper S3 of the adhesive sheet body S and they contact each other at a guide roller 81. The adhesive tape L and the adhesive sheet body S respectively pass through the guide roller 81, cleaning roller 7, pitch feed roller 6, upstream tension roller 5A, then they are pressed against each other. As a result, the adhesive face of the adhesive tape L is bonded onto the release paper S3 of the adhesive sheet body S.

After the adhesive sheet body S passes through the upstream tension roller 5A, the release paper S3 is peeled off from the adhesive sheet body S owing to adhesion of the adhesive tape L. When the adhesive tape L receives the release paper S3, it is wound by a winding roller 10 so that the release paper S3 is collected. The reason why the release paper S3 is collected when it is separated from the adhesive sheet body S using the adhesive tape L is caused by the difference of adhesion, namely, the adhesion of the adhesive tape L relative to the release paper S3 is greater than that of the adhesive agent S2 relative to the release paper S3. That, the adhesive tape L is must have adhesion relative to the release paper S3 which is greater than the peeling strength of the release paper S3 relative to the adhesive agent S2.

In such a manner, the release paper S3 is removed from the adhesive sheet body S that passes through the tension roller 5A and supplied between the holding table 2 and the laminating roller 1, and the adhesive agent S2 is exposed on the lower surface of the adhesive sheet body S.

Briefly referring to the laminating roller 1 serving as a laminating member having an important function according to the invention, it has a function to press the adhesive sheet body S to the lower disc-shaped substrate D1 so as to bond the adhesive sheet body S to the lower disc-shaped substrate D1.

Accordingly, it is preferable that the laminating roller 1 be provided with a layer made of a flexible material at the outer periphery thereof, and a heater built therein so that the entire laminating roller 1 can be heated and the heating can be adjusted. The width of the laminating roller 1 is designed to be slightly wider than that of the lower disc-shaped substrate D1. The laminating roller 1 can roll and move, by a driving apparatus (not shown), in parallel with the adhesive sheet body S while it presses the lower disc-shaped substrate D1. When the bonding of the adhesive sheet body S on the entire surface of the lower disc-shaped substrate D1 is completed, the laminating roller 1 is moved away from the lower disc-shaped substrate D1 and returns to the original position.

Meanwhile, the adhesive sheet body S is supported between the upstream tension roller 5A and the downstream tension roller 5B while the adhesive agent S2 formed of an LP (long-playing record)-shaped (doughnut shaped) sheet is provided at the lower surface thereof.

At this time if the lower end of the upstream tension roller 5A is slightly higher than that of the downstream tension roller 5B, the laminating can be performed in an excellent condition, described later. This is also important from a technical point of view.

If the adhesive sheet body S is moved, the adhesive sheet body S that is supported by the tension rollers 5A and 5B is fed in a state where a given tension is applied to the adhesive sheet body S by the driving of the feed roller 11, as shown in FIG. 1.

Then, when the adhesive sheet body S is stopped, the downstream tension roller 5B is slightly moved so that the tension is scarcely applied to the adhesive sheet body S (initial state).

Figure 3:
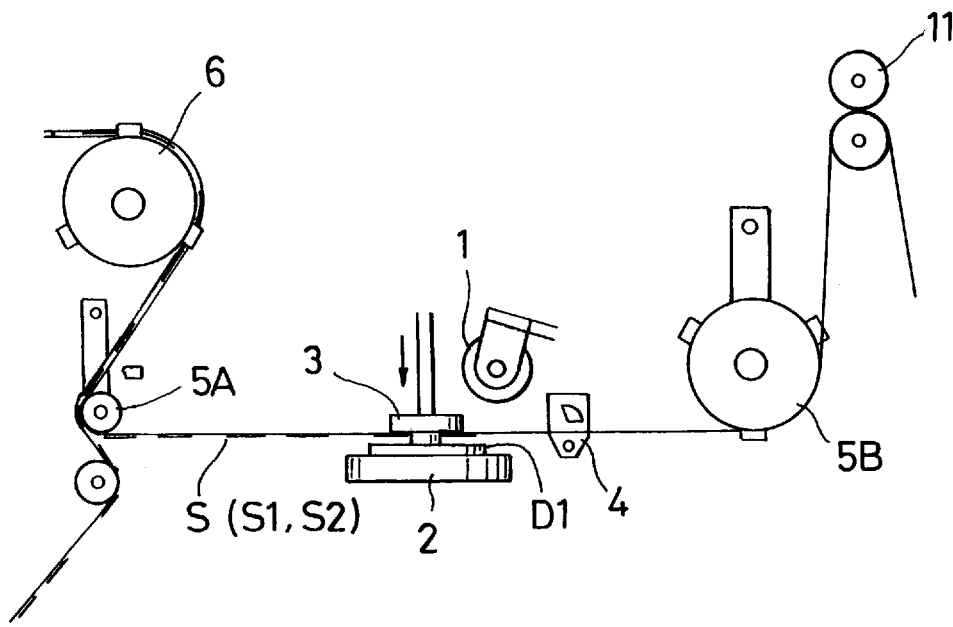
FIG. 3 is a view showing how to bond the adhesive agent.

Subsequently, as shown in FIG. 3, the centering shaft 3 serving as a positioning member is lowered so that the adhesive sheet body S (specifically, adhesive agent 52) is positioned relative to the lower disc-shaped substrate D1 by the projection (composed a first small diameter portion 31 and a second small diameter portion 32) provided on the tip end of the centering shaft 3.

Meanwhile, at the instant when the projection of the centering shaft 3 enters the hole P of the adhesive sheet body S when the centering shaft 3 is lowered, the upstream tension roller 5A is slightly retracted so as to apply the tension to the adhesive sheet body S. At this time, the downstream tension roller 5B is positioned as it is.

As mentioned above, when a slight tension is applied to the adhesive sheet body S, the adhesive sheet body S is placed in a stable state without being vibrated so that the first small diameter portion 31 of the centering shaft 3 can be accurately inserted into the hole P of the adhesive sheet body S.

Further referring to the positioning of the adhesive sheet bodys by the centering shaft 3, when the centering shaft 3 is lowered, the projection (first small diameter portion 31) provided at the lower end of a large diameter portion 33 is inserted into the hole P of the adhesive sheet body S, and the second small diameter portion 32 that is a part of the projection is engaged in a hole 21 defined in the boss (hereinafter referred to as a boss hole) of the holding table 2 (see FIG. 10A). At this time, the adhesive sheet body S and the lower disc-shaped substrate D1 are positioned concentrically.

That is, the first small diameter portion 31 provided at the tip end of the centering shaft 3 is inserted into the hole P of the adhesive sheet body S, and the second small diameter portion 32 of the centering shaft 3 that is smaller than the first small diameter portion 31 in diameter is inserted into the central hole H of the lower disc-shaped substrate D1 so that the centering shaft 3 is engaged in the boss hole 21.

Accordingly, the adhesive sheet body S and the lower disc-shaped substrate D1 are positioned concentrically.

At this time, since the adhesive sheet body S is tightened, it is positioned over the upper end of the small diameter portion 31 and contacts the lower surface of the large diameter portion 33. Accordingly, the adhesive sheet body S does not contact the surface of the lower disc-shaped substrate D1 so that the adhesive agent of the adhesive sheet body S is accurately positioned right over the lower disc-shaped substrate D1.

The adhesive agent is drawn through a small hole, not shown, provided on the holding table 2 and the lower disc-shaped substrate D1 is sucked and held by the holding table 2 without moving but remains positioned on the holding table 2.

When the adhesive sheet body S is disposed slightly inclined owing to the vertical relation between the upstream tension roller 5A and the downstream tension roller 5B, the adhesive sheet body S is tightened in an inclined state so that the first small diameter portion 31 provided at the tip end of the centering shaft 3 easily enters the hole P of the adhesive sheet body S.

Explaining the boss hole 21 provided on the holding table, a boss body, not shown, is installed slightly vertically in the boss hole 21.

Accordingly, when the lower disc-shaped substrate D1 is placed on the holding table 2 in the previous step, not shown, the boss body protrudes from the boss hole 21 so that the lower disc-shaped substrate D1 is positioned in advance relative to the holding table 2.

After the lower disc-shaped substrate D1 is placed on the holding table 2, the boss body stands by while it is retracted at the innermost of the boss hole 21, so as to avoid obstruction of the laminating operation of the adhesive sheet body S on the holding table 2.

Figure 4:
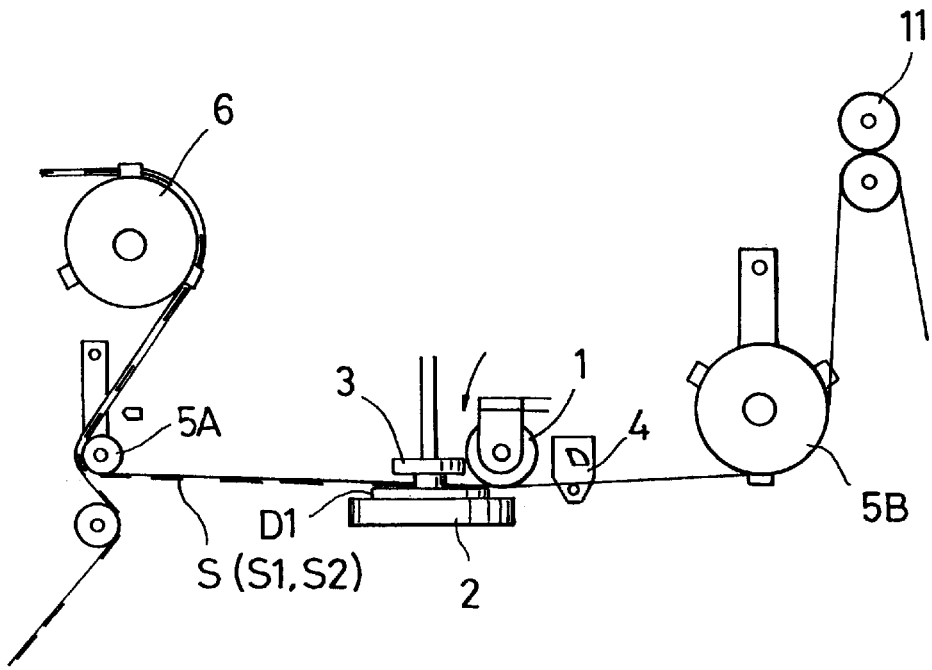
FIG. 4 is a view showing how to bond the adhesive agent.

Then, the laminating roller 1 that stands by at the upper portion of the lower disc-shaped substrate D1 is lowered to contact one end of the lower disc-shaped substrate D1 that has been already positioned (see FIG. 4).

Figure 5:
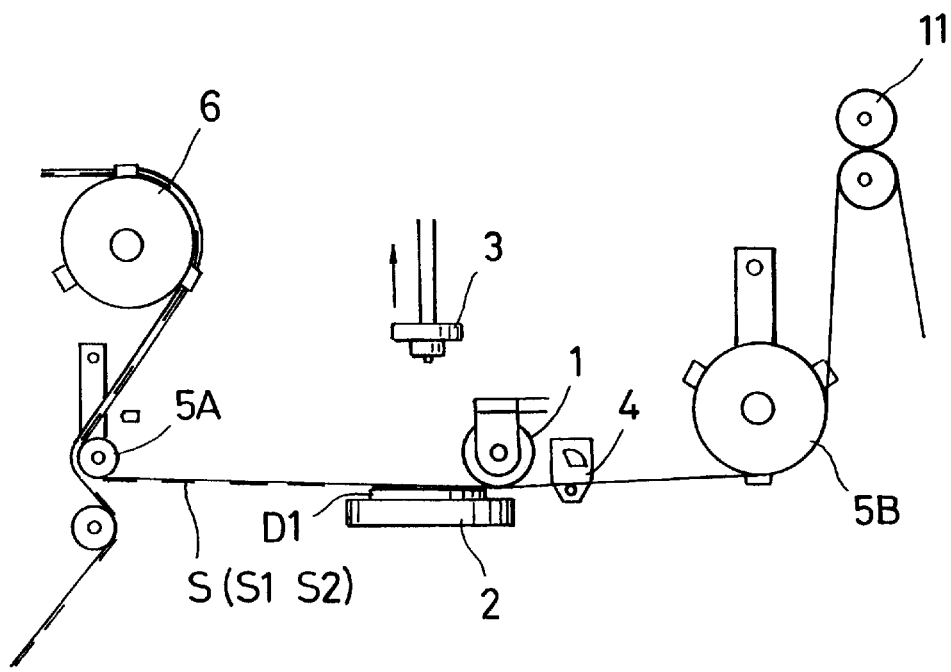
FIG. 5 is a view showing how to bond the adhesive agent.

At this time, the centering shaft 3 completes its function, and hence it rises immediately to return to the original position (see FIG. 5)

Figure 6:
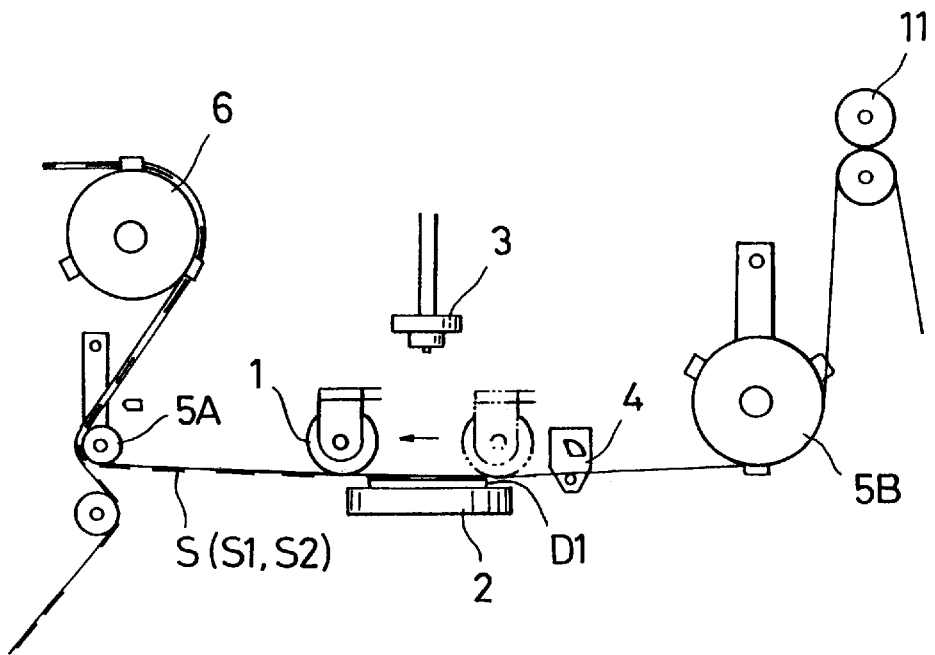
FIG. 6 is a view showing how to bond the adhesive agent.

Subsequently as shown in FIG. 6, the laminating roller 1 rolls on the lower disc-shaped substrate D1 (precisely on the adhesive sheet body S on the lower disc-shaped substrate D1) in the direction denoted by the arrow.

With the rolling operation of the laminating roller 1, the adhesive sheet body S is pressed against the lower disc-shaped substrate D1, and hence the contacting surface between the adhesive sheet body S and lower disc-shaped substrate D1 gradually enlarges.

Finally, when the laminating roller 1 passes the other end of the lower disc-shaped substrate D1, the adhesive sheet body S is completely bonded onto the entire surface of the lower disc-shaped substrate D1.

In such a special pressing manner, the adhesive agent S2 adhered to the lower surface of the adhesive sheet body S is bonded (transferred) to the surface of the lower disc-shaped substrate D1 without the interposition of air bubbles or the like, and puckering of the adhesive sheet body S is avoided.

The operations of the centering shaft 3 and the laminating roller 1 are now described more in detail.

Figure 10:
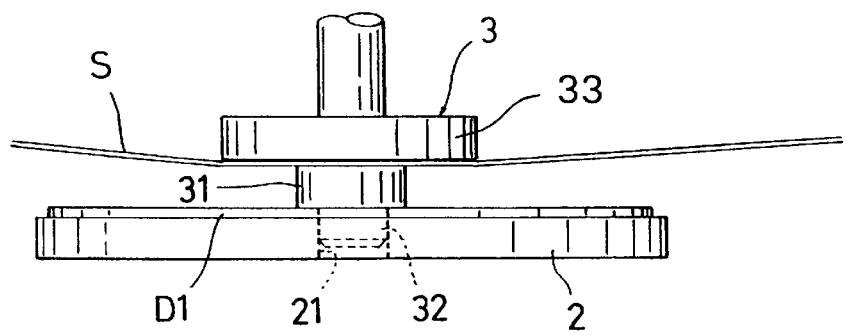
Figure 10:
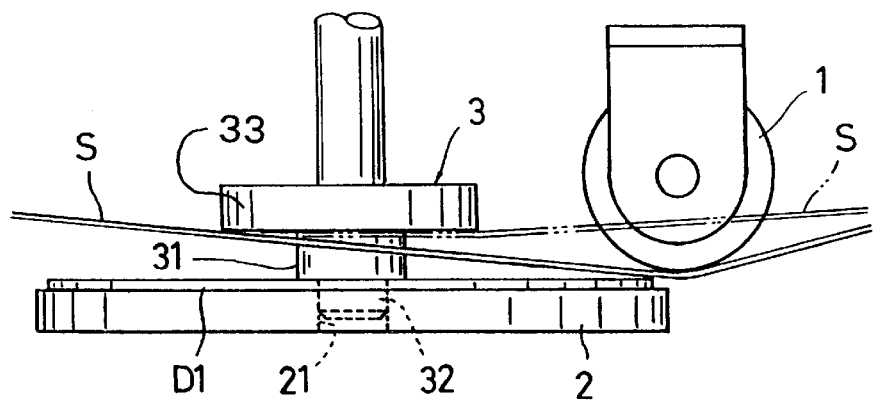
Figure 10:
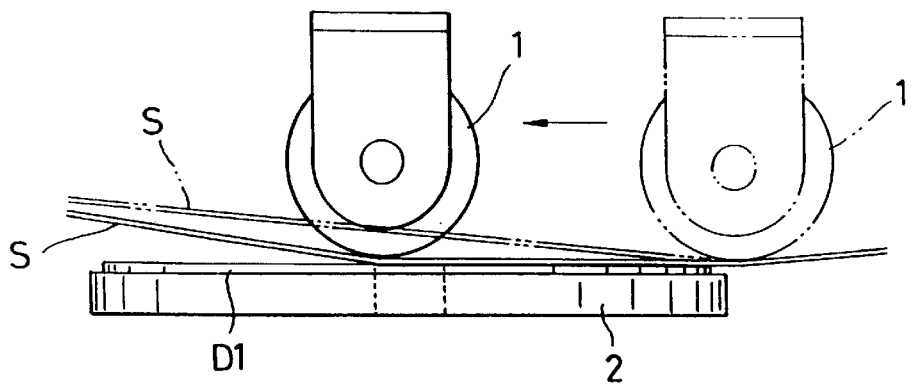

FIGS. 10(A), 10(B) and 10(C) are views showing the operations of the centering shaft 3 and laminating roller 1.

As shown in FIG. 10(A), the projection (second small diameter portion 32) of the centering shaft 3 is engaged in the holding table 2 and the adhesive sheet body S is positioned over the upper end of the first small diameter portion 31 of the projection in a state where the adhesive sheet body S is positioned in contact with the large diameter portion 33 of the centering shaft 3.

Further, since a slight tension is applied onto the adhesive sheet body S, the adhesive sheet body S does not contact the surface of the lower disc-shaped substrate D1, as mentioned above.

Then, as shown in FIG. 10(B), the laminating roller 1 is lowered to contact one end of the lower disc-shaped substrate D1. At this time, although a part of the adhesive sheet body S is pressed against the end of the lower disc-shaped substrate D1, the centering shaft 3 completes its function and moves away from the lower disc-shaped substrate D1 since the positioning of the adhesive sheet body S relative to the lower disc-shaped substrate D1 is completed.

As shown in FIG. 10(C), the laminating roller 1 rolls on the lower disc-shaped substrate D1 while pressing the adhesive sheet body S relative to the lower disc-shaped substrate D1. The adhesive agent S2 formed of the LP-shaped (doughnut shaped) sheet is applied from one end of the lower disc-shaped substrate D1 to the other end thereof in the manner that the bonded area between the adhesive sheet body S and the lower disc-shaped substrate D1 gradually enlarges in the direction from one end to the other end of the lower disc-shaped substrate D1.

At this time, since the adhesive sheet body S is subsequently pressed against the lower disc-shaped substrate D1 so as to remove the air therebetween in an inclined state, air bubbles or the like do not enter between the adhesive agent S2 and the lower disc-shaped substrate D1 and puckering is not generated therebetween. As a result, the adhesive agent S2 is uniformly bonded onto the surface of the lower disc-shaped substrate D1.

Figure 7:
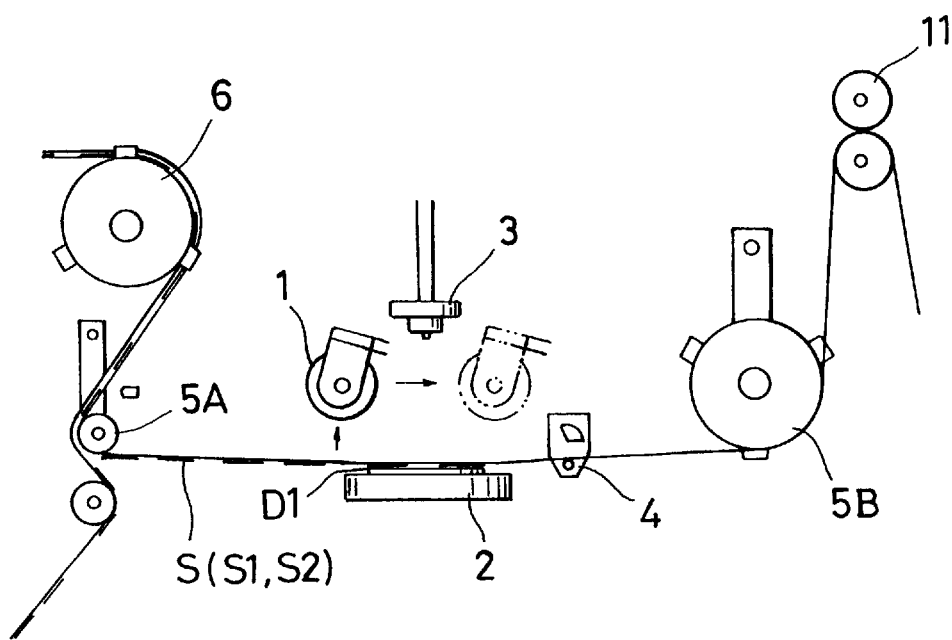
FIG. 7 is a view showing how to bond the adhesive agent.

Referring now back to FIG. 7, the laminating roller 1 rises and returns to the original position as shown in dotted lines upon completion of the bonding of the adhesive sheet body S relative to the lower disc-shaped substrate D1. At this time, the adhesive agent S2 is in a state where it is bonded onto both the adhesive sheet body S and the lower disc-shaped substrate D1, namely, in a state where the adhesive agent S2 is bonded onto both the carrier S1 of the adhesive sheet body S and the surface of the lower disc-shaped substrate D1.

Figure 8:
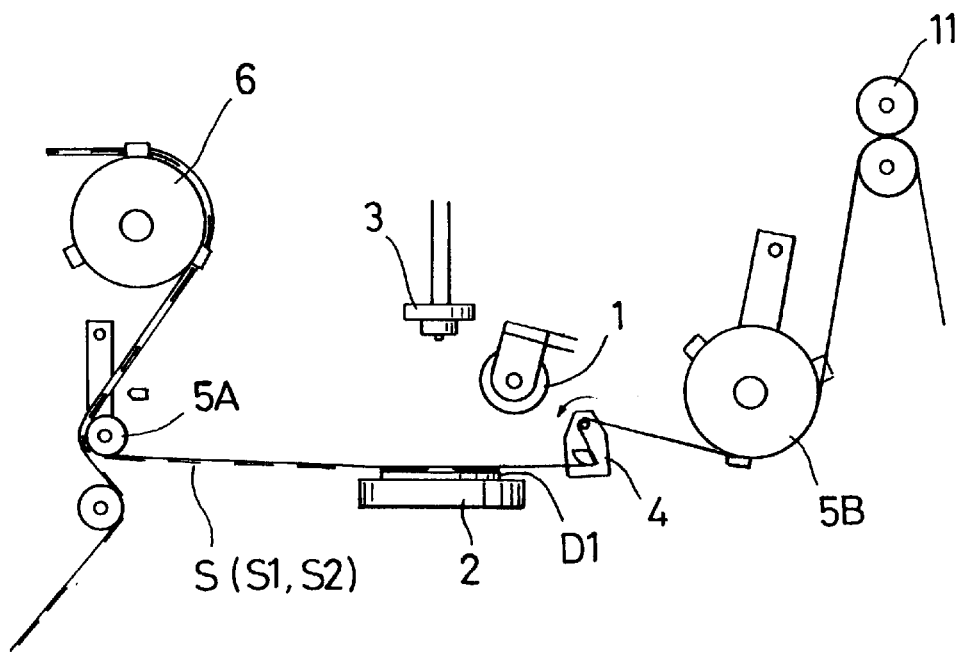
FIG. 8 is a view showing how to bond the adhesive agent.
Figure 9:
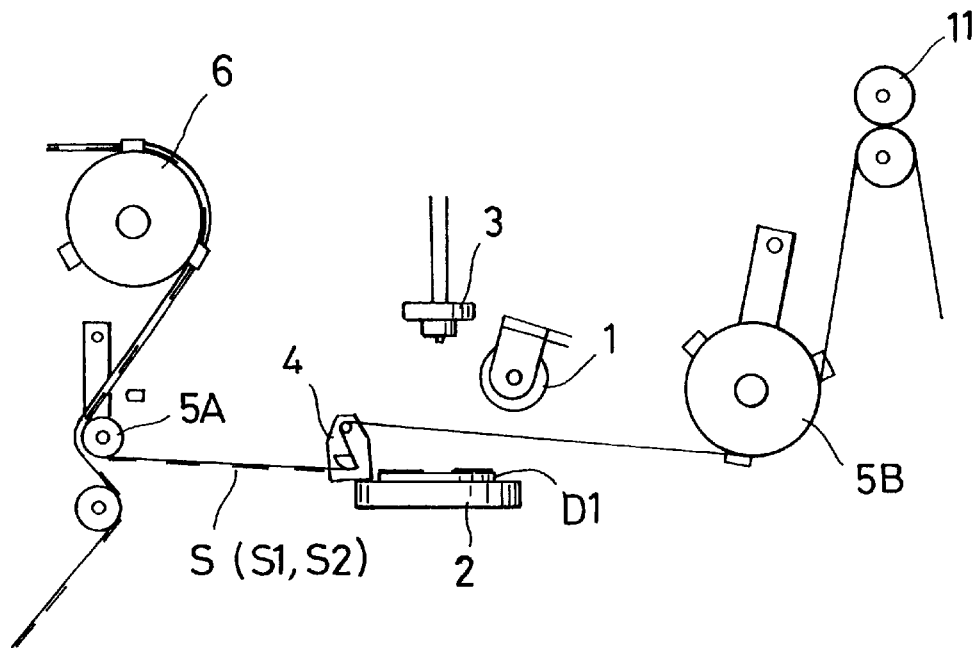
FIG. 9 is a view showing how to bond the adhesive agent.

Then, as shown in FIG. 8, a peeling member 4 that is positioned downstream relative to the holding table 2 traverses over the lower disc-shaped substrate D1 placed on the holding table 2. Since the viscosity of the adhesive agent S2 relative to the surface of the lower disc-shaped substrate D1 is greater than that relative to the carrier S1, the adhesive sheet body S and the adhesive agent S2 (precisely, the carrier S1 and the adhesive agent S2) are separated or peeled from one another when the peeling member 4 traverses. Since the lower disc-shaped substrate D1 is sucked and held by the holding table 2 as mentioned above, the peeling operation can be accurately performed.

The adhesive sheet body S is peeled off from the lower disc-shaped substrate D1 (precisely, the adhesive agent S2 on the lower disc-shaped substrate) and becomes free upon completion of the traverse of the peeling member 4.

The function of the peeling member 4 is now explained. The peeling member 4 comprises a rotating base or member 41 (rotating on its own axis) and two support rods respectively fixed to the base 41, and it is reciprocally movable so as to move across (traverse) over the holding table 2.

The two support rods comprise an angle restriction support rod 42 that is a fan-shaped rod body in cross section, and a leading support rod 43 that is a circular rod body having a small diameter. An arc of the fan-shaped rod body does not always conform to the shape formed in accordance with the length of the radius. The leading support rod 43 and the angle restriction support rod 42 are provided at positions remote from the center of the base 41 by given intervals.

The angle restriction support rod 42 supports the adhesive sheet body S in a state where the adhesive sheet body S and the lower disc-shaped substrate D1 do not contact each other to keep a slight gap therebetween. The angle restriction support rod 42 has an acute angle portion 42A for peeling off the adhesive sheet body S while keeping an acute guiding angle α, that is acute (90° or less) relative to the lower disc-shaped substrate D1. The shape of the angle restriction support rod 42 is not limited to that set forth above, if it has the acute angle portion 42A.

Figure 11:
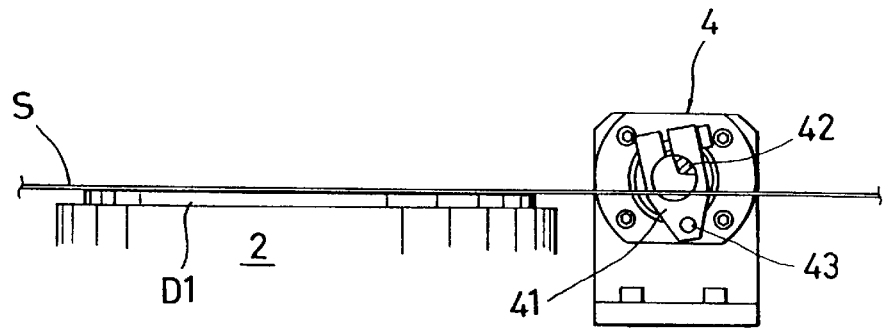
Figure 11:
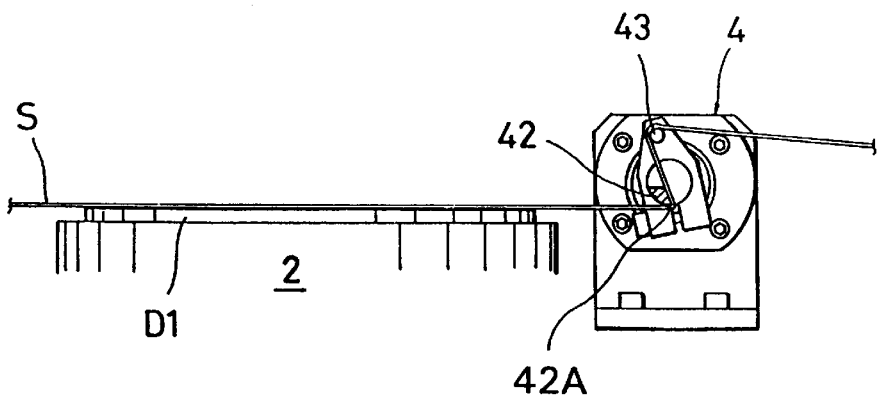
Figure 11:
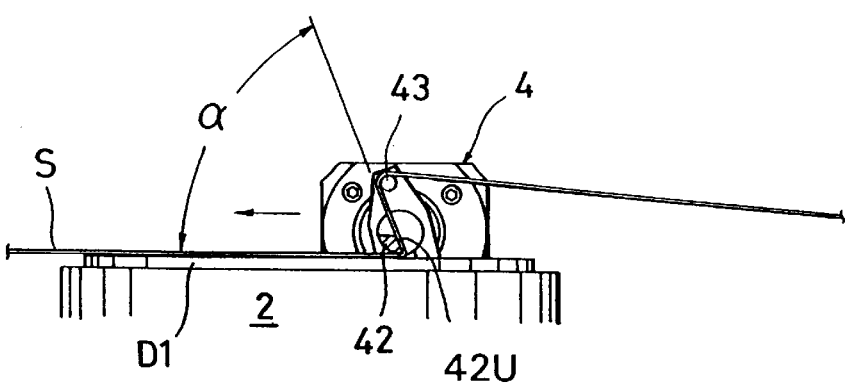

To peel off the adhesive sheet body S from the lower disc-shaped substrate D1, the peeling member 4 is first rotated about 180° in a state where the adhesive sheet body S is interposed between the angle restriction support rod 42 and the leading support rod 43 (see FIG. 11(A)), thereby forming the adhesive sheet body S in an inverse Z-shape (see FIG. 11(B)). Preferably, the leading support rod 43 may be rotated to an extent to assume a position where the acute angle portion 42A of the angle restriction support 42 affords the guide angle α. At this time, the adhesive sheet body S is extended between the angle restriction support rod 42 and the leading support rod 43.

Then, when the peeling member 4 is moved in parallel with the holding table or the lower disc-shaped substrate D1 so as to traverse over the holding table 2, the angle restriction support rod 42 of the peeling member 4 traverses in the manner that it supports the adhesive sheet body S in a state where the adhesive sheet body S and the lower disc-shaped substrate D1 do not contact each other to keep a slight gap therebetween, and it is pulled up by the leading support rod 43. In this case, the adhesive sheet body S is peeled off from the surface of the lower disc-shaped substrate D1 at an acute angle relative to the lower disc-shaped substrate D1, namely, in a state where the former is positioned at an acute angle relative to the latter owing to an oblique plane 42U of the angle restriction support rod 42 (see FIG. 11(C)).

Figure 12:
Figure 12:
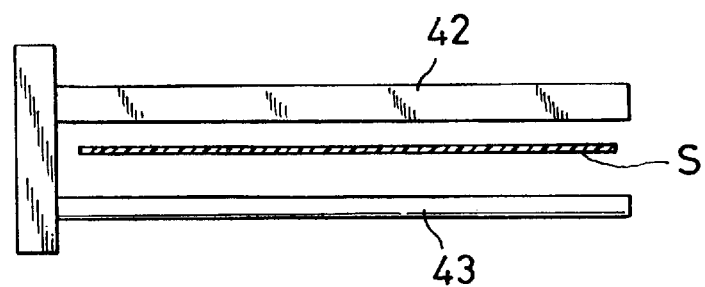

The shape of the angle restriction support rod 42 is not limited to that set forth above, if it has the acute angle portion 42A, for example, FIG. 12 shows a modified example of the angle restriction support rod 42.

FIGS. 12(A) and 12(B) are views showing a state where the adhesive sheet body S is interposed between the angle restriction support rod 42 and the leading support rod 43, wherein FIG. 12(A) is a simplified front view and FIG. 12(B) is a simplified side view.

Figure 13:
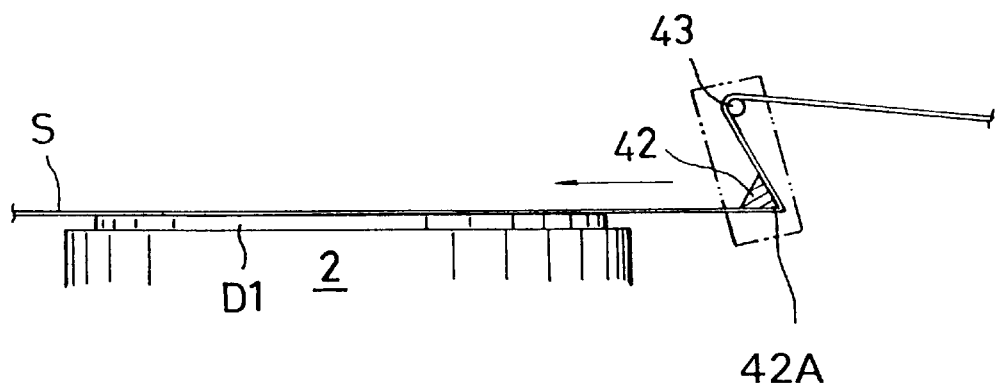
Figure 13:
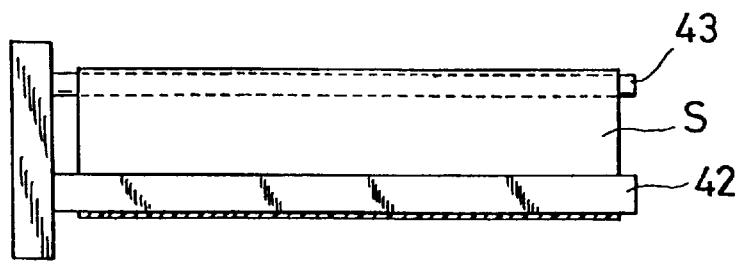

FIGS. 13(A) and 13(B) are views showing a state where the peeling member 4 is rotated so as to form the adhesive sheet body S in an inverse Z-shape wherein FIG. 13(A) is a simplified front view and FIG. 13(B) is a simplified side view.

In this modified example, the angle restriction support rod 42 is triangular in cross section and has the acute angle portion 42A.

If the guiding angle a of the adhesive sheet body S is acute, the adhesive agent S2 of the adhesive sheet body S is uniformly peeled off without adhering to the carrier S1 of the adhesive sheet body S.

For example, if the guiding angle α is obtuse (90° or more), a part of the adhesive agent S2 is frequently adhered to the carrier Si of the adhesive sheet body S.

The inventor of the application experimentally confirmed that the peeling operation is smoothly performed.

Figure 14:
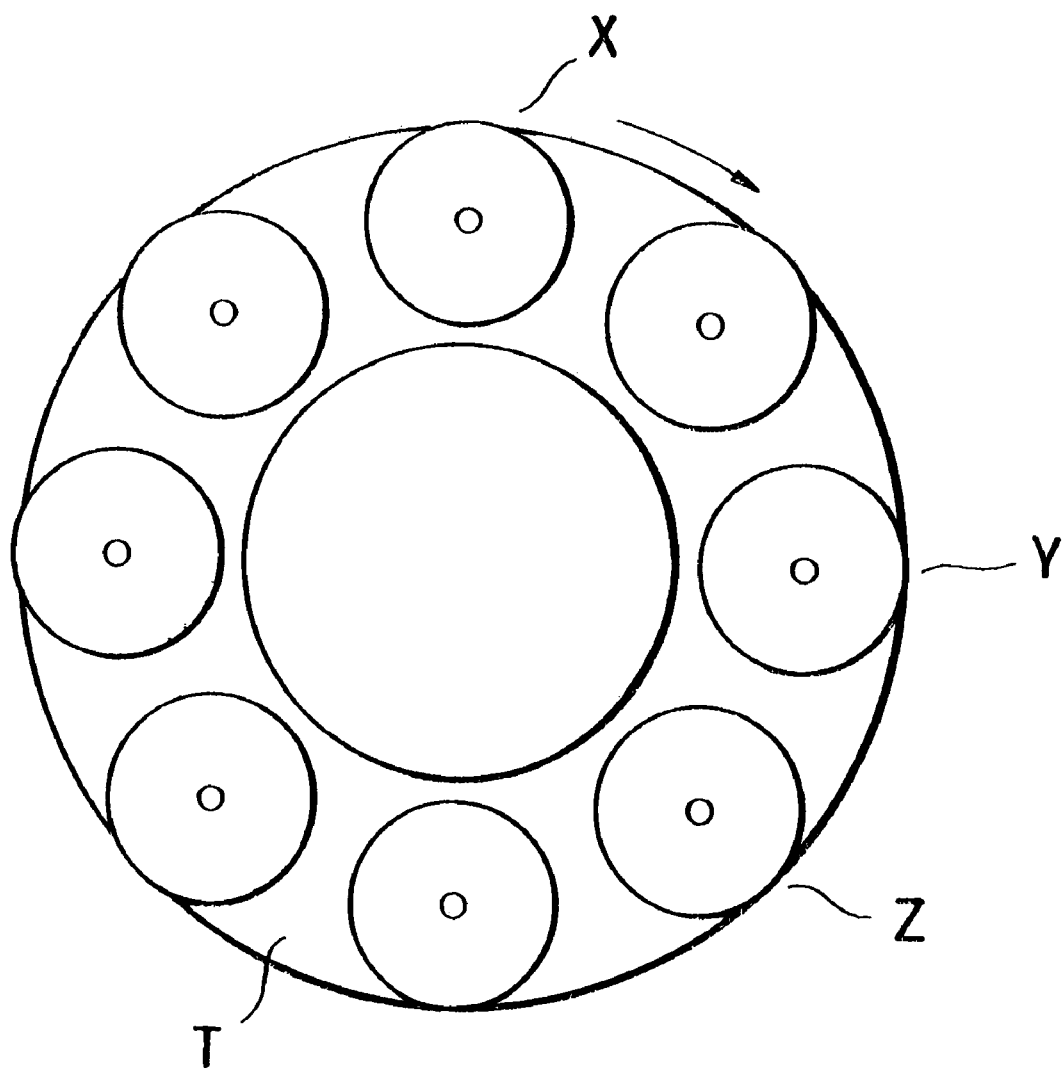
FIG. 14 is a view showing positions of each station.

After the adhesive sheet body S is peeled off from the lower disc-shaped substrate D1, the holding table 2 installed on a rotary table T at the station X is quickly moved to the next station Y. That is, the holding table 2 at the first station X on which the adhesive agent S2 is bonded onto the lower disc-shaped substrate D1 is moved to the next station Y (see FIG. 14). Thereafter, the peeling member 4 returns to the original position shown in FIG. 2.

Figure 15:
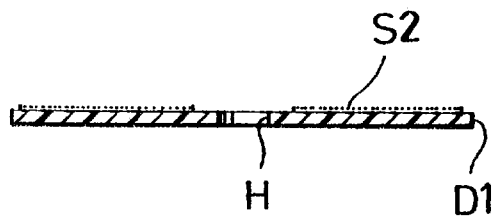
Figure 15:
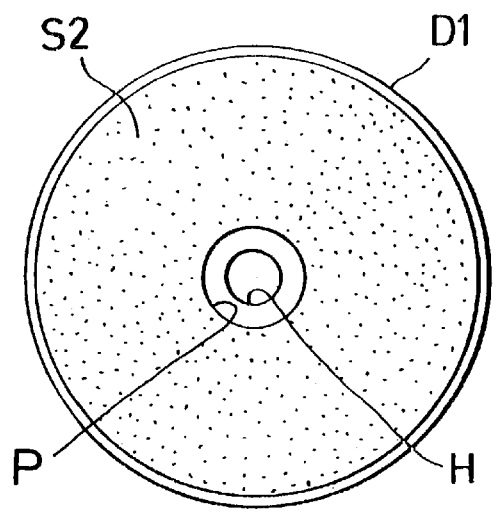

The adhesive agent S2 is bonded onto the lower disc-shaped substrate D1 as described above, and hence the adhesive agent S2 is uniformly bonded onto the lower disc-shaped substrate D1 as shown in FIG. 15.

Figure 16:
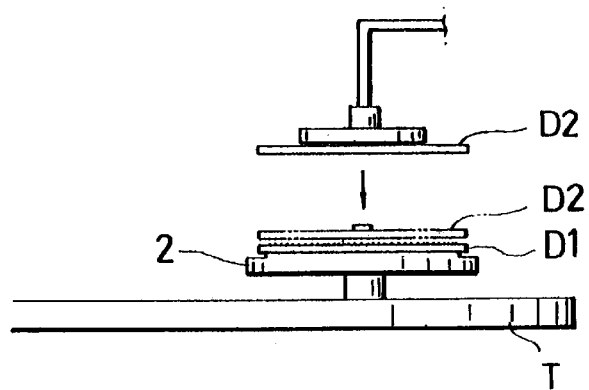
FIG. 16 is a view showing a manner for placing another lower disc-shaped substrate on an upper disc-shaped substrate which is placed on a holding table.

In the next station Y, another upper disc-shaped substrate D2 is overlaid and placed on the lower disc-shaped substrate D1 onto which the adhesive agent S2 is bonded (see FIG. 16). Since the lower and upper disc-shaped substrates D1 and D2 that are overlaid on each other are not subjected to press application, they are not firmly laminated with each other. Accordingly, the holding table 2 is moved to a third station Z (see FIG. 14) where two disc-shaped substrates D1 and D2 are subjected to press application so to be completely bonded onto each other.

Figure 17:
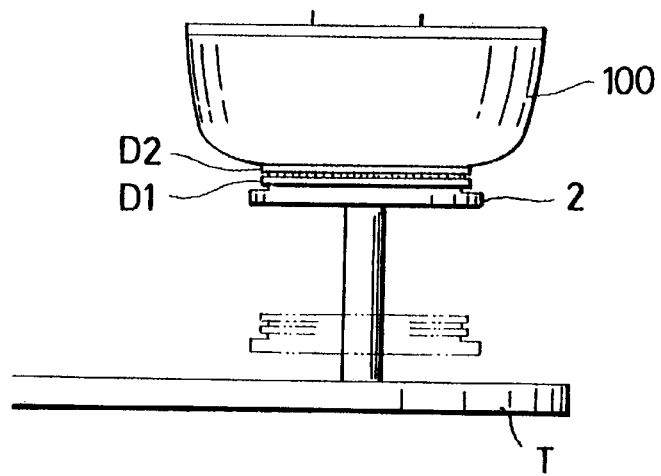
FIG. 17 is a view showing a state where two disc-shaped substrates that are placed on the holding table receive a pressing force.

FIG. 17 shows a state where the lower disc-shaped substrate D1 and upper disc-shaped substrate D2 that are placed on the holding table 2 are pressed against each other by a pressing body 100 (in this case, the holding table 2 rises). The pressing body 100 used here is hemispherical and formed of a flexible material. When the thus overlaid two disc-shaped substrates D1 and D2 receive the pressing force between the pressing body 100 and holding table 2, they are bonded strongly to each other.

Figure 18:
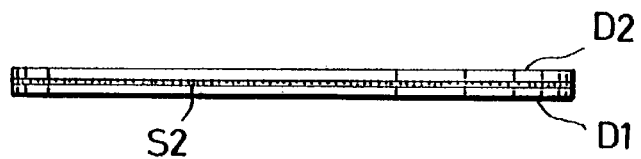
FIG. 18 is a view showing an optical disc formed by laminating two disc-shaped substrates.

Accordingly, the laminating roller 1 can press the upper disc-shaped substrate D2 in the manner so that the contact portion (pressing portion) between itself and the lower disc-shaped substrate D1 increases gradually from the central portion to the outer portion (radially). As a result, air bubbles or the like are not contained between the lower disc-shaped substrate D1 and upper disc-shaped substrate D2. In the manner set forth above, the lower disc-shaped substrate D1 and upper disc-shaped substrate D2 are completely bonded onto each other, thereby forming a high quality optical disc (See FIG. 18).

FIG. 19 is a block diagram showing main laminating steps 1 to 6 of the disc-shaped substrates.

Although the present invention has been described with reference to the preferred embodiment, it is not limited to this embodiment but can be modified variously without departing from the spirit of the invention.

Concrete means used to carry out the method of laminating disc-shaped substrates is not limited to those in the preferred embodiment as illustrated in the accompanying drawings.

For example, the construction of the laminating roller used in the present invention may be of any type having no heating means therein. The moving direction of the laminating roller for pressing the adhesive sheet body onto the disc-shaped substrate may be left to right in addition to right to left shown in FIG. 6.

Further, the peeling member may be of any means for holding and stretching the release paper in addition to the peeling member as disclosed in the preferred embodiment.

With the arrangement of the method of laminating the disc-shaped substrates according to the present invention, the adhesive agent separated from the adhesive sheet body can be uniformly bonded onto the surface of the lower disc-shaped substrate without containing air bubbles or the like and puckering is not generated therebetween. Different from the conventional method using UV cured resin, the developing step of the adhesive agent and the irradiating step of UV are respectively dispensed with, thereby reducing the manufacturing steps of the storage disc.

When two disc-shaped substrates are bonded to complete the optical disc, the thickness of the intermediate layer (adhesive agent layer) between two disc-shaped substrates can be easily changed by merely changing the thickness of the adhesive agent bonded onto the adhesive sheet body. It is possible to automate the bonding of the adhesive agent on one of disc-shaped substrates, thereby enabling very effective sequential laminating steps.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. A method of laminating disc-shaped substrates comprising the steps of:
   (1) preparing an adhesive sheet body comprising a plurality of adhesive agents each covered with a release paper;
   (2) peeling off a release paper from the adhesive sheet body;
   (3) positioning an adhesive agent of the adhesive sheet body over a lower disc-shaped substrate by inserting an end of a positioning member into a hole of the adhesive sheet body;
   (4) pressing the adhesive sheet body from which the release paper has been peeled to allow the adhesive agent adhered to a lower surface of the adhesive sheet body to transfer and bond onto a surface of the lower disc-shaped substrate by rolling a laminating roller from one end of the lower disc-shaped substrate to the other end thereof;
   (5) peeling off the adhesive sheet body from the adhesive agent bonded onto the surface of the lower disc-shaped substrate with a peeling member which traverses the lower disc-shaped substrate while supporting the adhesive sheet body in a state where the adhesive sheet body and the lower disc-shaped substrate do not contact each other to maintain a gap therebetween;
   (6) placing an upper disc-shaped substrate on the lower disc-shaped substrate; and
   (7) pressing the upper disc-shaped substrate against the lower disc-shaped substrate to bond the lower disc-shaped substrate and the upper disc-shaped substrate.

2. The method of laminating disc-shaped substrates according to claim 1, wherein the step (4) includes rolling the laminating roller in a direction from one end of the lower disc-shaped substrate to the opposite end thereof while supporting the adhesive sheet body in an inclined state relative to the lower disc-shaped substrate with a lowermost portion of the adhesive sheet body disposed adjacent said one end of the lower disc-shaped substrate to prevent air bubbles from forming between the adhesive agent and the lower disc-shaped substrate.

3. A method of laminating disc-shaped substrates comprising the steps of:
   (1) providing an adhesive sheet body comprising a plurality of adhesive agents each covered with a release paper;
   (2) peeling off a release paper from the adhesive sheet body;
   (3) positioning an adhesive agent of the adhesive sheet body over a lower disc-shaped substrate by inserting a tip of a centering shaft serving as a positioning member into a hole of the adhesive sheet body;
   (4) pressing the adhesive sheet body after peeling of the release paper therefrom against the lower disc-shaped substrate to allow the adhesive agent adhered to a lower surface of the adhesive sheet body to bond onto a surface of a lower disc-shaped substrate by moving a laminating member from one end of the lower disc-shaped substrate to an opposite end thereof;
   (5) peeling off the adhesive sheet body from the adhesive agent bonded onto the lower disc-shaped substrate using a peeling member;
   (6) placing an upper disc-shaped substrate on the lower disc-shaped substrate; and
   (7) pressing the upper disc-shaped substrate against the lower disc-shaped substrate to integrally laminate the upper and lower disc-shaped substrates.

4. The method of laminating disc-shaped substrates according to claim 3, further including a step of collecting the release paper.

5. The method of laminating disc-shaped substrates according to claim 4, wherein the step of collecting the release paper is performed using an adhesive tape having an adhesion relative to the release paper which is greater than an adhesion of the adhesive agent relative to the release paper.

6. The method of laminating disc-shaped substrates according to claim 3, wherein the step (3) is performed in a state where a weak tension is applied to the adhesive sheet body to prevent contact with the surface of the lower disc-shaped substrate.

7. The method of laminating disc-shaped substrates according to claim 3, wherein the adhesive sheet body during the step (3) is inclined relative to the lower disc-shaped substrate to aid in insertion of the tip of centering shaft into the hole of the adhesive sheet body.

8. The method of laminating disc-shaped substrates according to claim 3, wherein the laminating member used in the step (4) is a laminating roller, and the step (4) includes rolling the laminating roller across the lower disc-shaped substrate from one end thereof to the opposite end thereof.

9. The method of laminating disc-shaped substrates according to claim 3, wherein the peeling of step (5) is performed by the peeling member which traverses over the lower disc-shaped substrate.

10. The method of laminating disc-shaped substrates according to claim 9, wherein the peeling member peels off the adhesive sheet body from the adhesive agent while supporting the adhesive sheet body in a state where the adhesive sheet body and the lower disc-shaped substrate do not contact each other to maintain a gap therebetween.

11. The method of laminating disc-shaped substrates according to claim 9, wherein the peeling member has two support rods and the step (5) includes extending the adhesive sheet body between the two support rods.

12. The method of laminating disc-shaped substrates according to claim 11, wherein the peeling member peels off the adhesive sheet body so that part of same extends between the two support rods and is positioned so as to define an acute angle with the lower disc-shaped substrate to uniformly peel the adhesive sheet body from the lower disc-shaped substrate.

13. The method of laminating disc-shaped substrates according to claim 9, wherein the peeling member peels off the adhesive sheet body from the adhesive agent so that the adhesive sheet body is maintained at an acute angle as defined between the adhesive sheet body and the lower disc-shaped substrate.

14. The method of laminating disc-shaped substrates according to claim 3, wherein the peeling of step (5) includes: providing a peeling member which is rotatable about a generally horizontal axis and which mounts thereon first and second support rods which are spaced from one another; positioning the adhesive sheet body generally horizontally between the first and second support rods with the first support rod disposed uppermost and the second support rod disposed lowermost; rotating the peeling member approximately 180 degrees to reverse the positions of the respective support rods so that same engage the adhesive sheet body and place the adhesive sheet body in an inverse Z-shaped configuration with a portion of the adhesive sheet body extending generally vertically between the respective support rods and defining an acute angle with respect to an upper surface of the lower disc-shaped substrate; and thereafter moving the peeling member across the lower disc-shaped substrate to remove the adhesive sheet body therefrom while maintaining a gap between the adhesive sheet body and the lower disc-shaped substrate.

15. A laminating apparatus for laminating disc-shaped substrates comprising a holding table for supporting a disc-shaped substrate thereon, supporting members between which an adhesive sheet body extends so as to be positioned over the holding table, a centering shaft for positioning the adhesive sheet body relative to the disc-shaped substrate, a laminating roller for pressing the adhesive sheet body against the disc-shaped substrate to bond the adhesive sheet body onto the disc-shaped substrate by moving across the disc-shaped substrate from one end thereof to the other end thereof, and a peeling member for peeling off the adhesive sheet body bonded onto the disc-shaped substrate from the disc-shaped substrate.

16. The laminating apparatus for laminating disc-shaped substrates according to claim 15, wherein the centering shaft includes a first portion configured for insertion into a boss hole of the holding table, a second portion configured for insertion into a hole of the adhesive sheet body, and a third portion that contacts a surface of the adhesive sheet body which faces away from the disc-shaped substrate.

17. The laminating apparatus for laminating disc-shaped substrates according to claim 16 wherein said first portion defines a lowermost terminal end portion of said centering shaft and said second portion is disposed between said first and third portions, said first, second and third portions being disposed in vertically stacked adjacent relationship with one another, and said first, second and third portions having varying diameters with said third portion having the largest diameter, said first portion having the smallest diameter, and said second portion having a diameter intermediate the diameters of said first and third portions.

18. The laminating apparatus for laminating disc-shaped substrates according to claim 15, wherein the peeling member is mounted for reciprocal movement relative to the holding table and includes a base mounted for rotation, a first support rod and a second support rod respectively provided at predetermined spaced intervals from a center of the base.

19. The laminating apparatus for laminating disc-shaped substrates according to claim 18, wherein the second support rod of the peeling member has an acute angle portion by which the adhesive sheet body is peeled off of the disc-shaped substrate at an acute guiding angle.

20. The laminating apparatus for laminating disc-shaped substrates according to claim 18 wherein said first and second support rods are spaced from one another and a portion of the adhesive sheet body extends therebetween such that the adhesive sheet body defines an inverse Z-shaped configuration, said first and second support rods being movable into respective uppermost and lowermost positions, said second support rod when in said lowermost position maintaining the adhesive sheet body in a position so that the portion thereof which extends between the respective support rods defines an acute angle with respect to the disc-shaped substrate.

\* \* \* \* \*